United States Patent [19]

Smith

[11] Patent Number: 4,567,013

[45] Date of Patent: Jan. 28, 1986

[54] HYDROGEN MEASURING DEVICE

[75] Inventor: Robert Smith, Bethesda, Md.

[73] Assignee: Scandpower, Inc., Bethesda, Md.

[21] Appl. No.: 534,717

[22] Filed: Sep. 22, 1983

[51] Int. Cl.$^4$ .............................................. G21C 17/00
[52] U.S. Cl. ..................................... 376/247; 376/256
[58] Field of Search ................................ 376/247, 256

[56] References Cited

U.S. PATENT DOCUMENTS

| | | | |
|---|---|---|---|
| 3,060,726 | 10/1962 | Weber | 376/256 |
| 3,683,272 | 8/1972 | Vissers et al. | 376/256 |
| 4,298,430 | 11/1981 | Rolstad et al. | 376/247 |
| 4,411,858 | 10/1983 | Smith | 376/247 |
| 4,411,859 | 10/1983 | Smith et al. | 376/247 |
| 4,414,177 | 11/1983 | Tokarz | 376/247 |
| 4,425,297 | 1/1984 | Rolstad et al. | 376/247 |
| 4,459,045 | 7/1984 | Smith | 376/247 |

Primary Examiner—Sal Cangialosi
Attorney, Agent, or Firm—Eric P. Schellin

[57] ABSTRACT

A hydrogen measuring apparatus comprising two gamma thermometers. Both gamma thermometers are mounted adjacent and parallel to each other. Each is provided with a plurality of annular enclosed spaces formed in an elongated rod. Each annular space is provided with a hot junction of a difference thermocouple. The annular spaces of one of the gamma thermometers is either filled with a gas other than hydrogen, or surrounded by a hydrogen blocking material to prevent hydrogen contamination of the annular spaces. The annular spaces in the other gamma thermometer are placed in a vacuum and become contaminated with hydrogen. By comparing the power generation readings of the two thermometers free hydrogen partial pressure can be calculated.

8 Claims, 1 Drawing Figure

HYDROGEN MEASURING DEVICE

FIELD OF THE INVENTION

This invention pertains to a device for measuring small partial pressures of free hydrogen gas inside a nuclear reactor.

BACKGROUND OF THE INVENTION

During the last 20 years, a number of improvements have been taking place in controlling water chemistry in nuclear reactors and other vessels such as boilers and tanks in power plants and on ships, in a way to minimize corrosion and extend lifetime of the materials from which vessels, tanks and pipe lines are constructed. In the 1960's and 70's, and earlier, materials such as sodium hypo-sulfite (Na(H)SO$_3$) and bi-hydrogen phosphate, hydrozinc and other essentially hydrogen-rich oxygen "getters" were being added to waters with the primary purpose of providing free hydrogen to collect free oxygen that would otherwise cause corrosion (oxidation) of metallic components. In the 1970's and 1980's particularly in nuclear plants, water chemists began the introduction of gaseous hydrogen directly into the circulating water, this being made possible by economic considerations, and being desirable to eliminate various undesirable anions and cations introduced along with the hydrogen, when it had been added in relatively unstable chemical compounds. The excesses of free hydrogen also collect free oxygen produced radiologically by neutronic reactions that disassociate cooling water.

It has always been possible to meter the amounts of free hydrogen being added at a single point to systems containing many (sometimes hundreds) of tons of water. It has also been possible to draw samples from various points and measure by chromotography or wet analysis or spectrography how much hydrogen existed in the sample. It has not heretofore been possible, however, to measure exactly how much hydrogen actually existed in water deep inside the systems or vessels at the actual surface where corrosion was most damaging. The fuel surfaces in a nuclear reactor for example comprise about 14 acres of surface distributed among 47,000 pins, 12 feet long. Similar large, surface areas exist in steam generator and condensor tubes, where oxidation/corrosion reactions can occur.

SUMMARY OF THE INVENTION

The aim of the invention is to measure the partial pressure of very small amounts of free hydrogen gas at various sites in the core of a nuclear reactor. A further aim is to construct such a device to be so rugged as to survive in the reactor environment. Another aim is to construct such a device of materials which will not significantly affect reactivity.

U.S. Pat. No. 4,298,430 to Rolstad et al, the disclosures of which are hereby incorporated by reference, describes a gamma thermometer developed by the assignee of this patent. During the course of the development of the gamma theremometer, much was learned about the leakage of gases through instrument walls. For example if an evacuated canister made of stainless steel is placed in the core environment the free hydrogen gas will pass through the wall of the canister and come to an equilibium at the partial pressure of the free hydrogen in the surrounding coolant water. Hydrogen gas has a high thermal conductivity.

The table below shows some values of thermal conductivity (in Watts/cm$^2$—°C./cm) for various gasses at two temperatures:

| Gas      | Symbol | M  | k(0° C.) | k(300° C.) |
|----------|--------|----|----------|------------|
| Hydrogen | H2     | 2  | .0017    | .00290     |
| Helium   | He     | 4  | .0014    | .00250     |
| Nitrogen | N2     | 28 | .0002    | .00043     |
| Argon    | Ar     | 40 | .00016   | .00030     |

The combination of high permeability plus high conductivity make hydrogen a nuisance in maintaining the calibration of a gamma thermometer. An insulating vacuum in stainless steel jacketing is impossible to maintain under these conditions. The calibration of a gamma thermometer in which vacuum is used for insulation will shift as the concentration of free hydrogen in the water changes. This shift in calibration provides the principle for a hydrogen concentration measuring device. A gamma thermometer in which the calibration is made insensitive to hydrogen by filling with a gas such as Argon is placed adjacent to a gamma thermometer which as been evacuated. The gas filled and evacuated gamma thermometers are both calibrated to indicate power generation rate in a hydrogen free environment. When placed together in a reactor core different power generation rates will be indicated on the two gamma thermometers. The gamma thermometer filled with gas will indicate true power generation rate. The gamma thermometer which was evacuated will now be contaminated with hydrogen. The difference between the indicated signals of the two gamma thermometers is the measure of the free hydrogen partial pressure.

These and further constructional and operational characteristics of the invention will be evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 1:
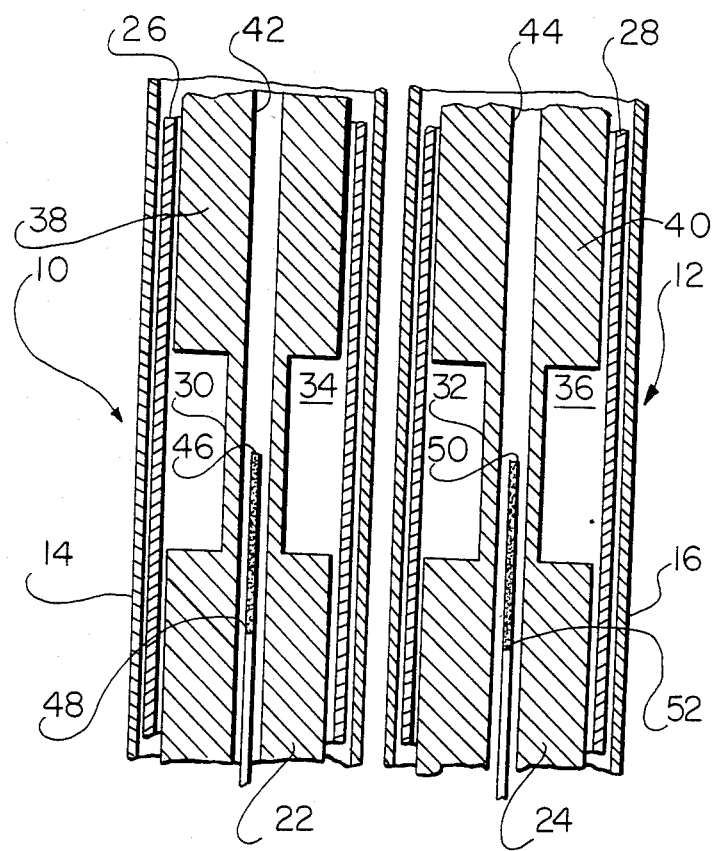
FIG. 1 is a section view through a hydrogen sensor adjacent to a gamma thermometer.

Referring now to the drawing wherein reference numerals are used to designate parts throughout the figure thereof, there is shown in FIG. 1 a sectional view of the hydrogen sensor 10 on the left together with a gamma thermometer 12 on the right. The hydrogen sensor 10 is located within a shielding tube 14 in the core of the reactor. Similarly the gamma thermometer is located in a shield tube 16 adjacent to the hydrogen sensor 10. The hydrogen sensor is a cylindrical rod 22 of relatively small diameter and substantial length formed of material having good heat conductivity and good electrical conductivity and preferably formed of a metal such as stainless steel, for example, or on an alloy or of suitable conductive ceramic material, and a tube 26 of shielding the cylindrical rod 22 which is inserted into tube 26. The gamma thermometer has a corresponding rod 24 and tube 28.

The above-mentioned cylindrical rod 22 which is of substantial length is thus capable of extending to the full height of the outer shielding tube 14 within the full assembly of the reactor and is provided with reduced radial portions 30. The gamma thermometer has corresponding reduced radial portions 32. Once the cylindrical rod is placed in position within said tube 14, the reduced-section portions 30 and 32 are located at the level of the zones at which free hydrogen concentration are intended to be measured. These portions are surrounded by annular chambers 34 defined between said portions 30 and the internal wall of the tube 26 in the example of the construction shown. The gamma thermometer has corresponding annular chambers 36. The tube 26 is secured to the normal non-reduced portion 38 of the rod 22 in a fluid tight manner whereby the chamber 34 may be evacuated. Similarly the tube 28 is secured to the normal non-reduced portion 40 of the rod 24 in a fluid tight manner whereby the chamber 36 may be evacuated and then filled with a gas such as Argon.

Also in accordance with the invention, the cylindrical rod 22 has a longitudinal axial bore 42 which extends the full length of said rod. Cylindrical rod 24 has a corresponding bore 44. A plurality of thermocouples are positioned therein. Each thermocouple is positioned so that a hot thermocouple junction 46 is placed substantially at the mid-section of each reduced-section portion 30 and a cold junction 48 is placed beyond the end of the corresponding chamber 34 within the normal-section portion 38 of the cylindrical rod 22. The gamma thermometer has corresponding hot junction 50 and cold junction 52.

In an alternative embodiment the annular chambers 34 and 36 are both evacuated. The tube 26 is made of stainless steel while the tube 28 is made of an outer layer of stainless steel of Inconel for strength and an inner layer of Zircaloy to block the passage of hydrogen.

Either of the above embodiments may be combined with ohmic heating of the rods 22 and 24 for calibration purposes as described in the Rolstad U.S. Pat. No. 4,298,430.

Furthermore, in an vessel having no gamma heating the hydrogen senser can be operated by itself using ohmic heating; in such an environment the sensor readings can be obtained directly as the difference between the reading with free hydrogen present and the reading at the same heating current without hydrogen present. When gamma radiation is present such as in the reactor environment it is necessary to have a gamma thermometer adjacent to the hydrogen sensor to correct the reading of the hydrogen sensor for fluctuations in power generation rate. The hydrogen measure can then be taken as the difference between the indicated temperature difference in the hydrogen sensor minus the indicated temperature difference in the gamma thermometer.

The hydrogen sensor so constructed can measure partial pressures of free hydrogen between about $10^{-7}$ atm. and $10^{-3}$ atm. At pressures above $10^{-3}$ atm. the response of the sensor becomes similar to that of an argon filled sensor, insensitive to free hydrogen concentration changes.

Other details of gamma thermometer construction can be seen in U.S. Pat. Nos. 4,313,792, 4,356,601, 4,411,858, 4,411,859, 4,418,035, 4,425,297, 4,439,396, 4,440,716, and 4,459,045 all assigned to the assignee of this patent, the disclosures of which are incorporated by reference.

Inconel is a trademark for a nickel-chromium alloy made by Huntington Alloys Inc., Huntington W.Va. Zircaloy is a trademark for a zirconium alloy made by Westinghouse Electric Corp., Specialty Metals Div., Blairsville, Pa.

This invention is not limited to the preferred embodiment and alternatives heretofore described, to which variations and improvements may be made, consisting of mechanically and electrically equivalent modifications to component parts and procedures without leaving the scope of the present patent, the characteristics of which are summarized in the following claims.

What is claimed is:

1. A device for measuring free hydrogen concentration in the coolant of a nuclear reactor, the device comprising:
   two gamma thermometers each comprising an elognated rod that is housed in a sheath, the rod is provided with a series of enclosed annular spaces formed between the rod and the sheath, a plurality of difference thermocouples are disposed along the rod and have hot and cold junctions, the hot junctions of the thermocouples are positioned adjacent the annular spaces and the cold junctions are positioned between the annular spaces;
   whereby the annular spaces form annular heat insulating chambers for the hot junctions of the thermocouples, a vacuum is formed in the annular heat insulating chambers of the first of the two gamma thermometers for insulating the hot junctions and providing a space in which free hydrogen can collect, in the annular heat insulating chamber of the second of the two gamma thermometers a gas other than hydrogen is disposed therein to prevent hydrogen contamination of the annular space; and
   the two gamma thermometers are positioned parallel and adjacent to one another so that the free hydrogen partial pressure can be calculated from the comparison of the indicated power generation rates of the two adjacent and parallel gamma thermometers.

2. A device as defined by claim 1 wherein each gamma thermometer is provided with a plurality of measurement zones formed by the annular spaces and the thermocouples associated with each annular space the two adjacent gamma thermometers are provided with an equal number of measurement zones.

3. A device as defined by claim 2 wherein the measurement zones of the adjacent gamma thermometers are directly opposite one another at the same vertical elevation.

4. A device as defined by claim 3 wherein the gas other than hydrogen is argon.

5. A device for measuring free hydrogen concentration in the coolant of a nuclear reactor, the device comprising:
   two gamma thermometers each comprising an elongated rod that is housed in a sheath, the rod is provided with a series of enclosed annular spaces formed between the rod and the sheath, a plurality of difference thermocouples are disposed along the rod and have hot and cold junctions, the hot junctions of the thermocouples are positioned adjacent the annular spaces and the cold junctions are positioned between the annular spaces;
   whereby the annular spaces form annular heat insulating spaces for the hot junctions of the thermocouples, a vacuum is formed in the annular heat insulating chambers of the first of the two gamma thermometers for insulating the hot junctions and providing a space into which free hydrogen can collect, the sheath surrounding the second gamma thermometer is formed of a hydrogen blocking material that prevents hydrogen from entering the annular heat insulating chambers; and the two gamma thermometers are positioned parallel and adjacent to one another so that free hydrogen parital pressure can be calculated from the comparison o the indicated power generation rates of the two adjacent and parallel gamma thermometers.

6. A device as defined by claim 1 wherein each gamma thermometer is provided with a plurality of measurements zones formed by the annular spaces and the thermocouples associated with each annular space the two adjacent gamma thermometers are provided with an equal number of measurement zones.

7. A device as defined by claim 2 wherein the measurement zones of the adjacent gamma thermometers are directly opposite one another at the same vertical elevation.

8. A device as defined by claim 7 wherein the hydrogen blocking material is a zirconium alloy.

* * * * *